Feb. 7, 1939.  A. RICCIO  2,145,890

APPARATUS FOR REINFORCING INNER TUBES

Filed Sept. 29, 1936   2 Sheets-Sheet 1

INVENTOR.
BY Anthony Riccio
John P. Chandler
HIS ATTORNEY.

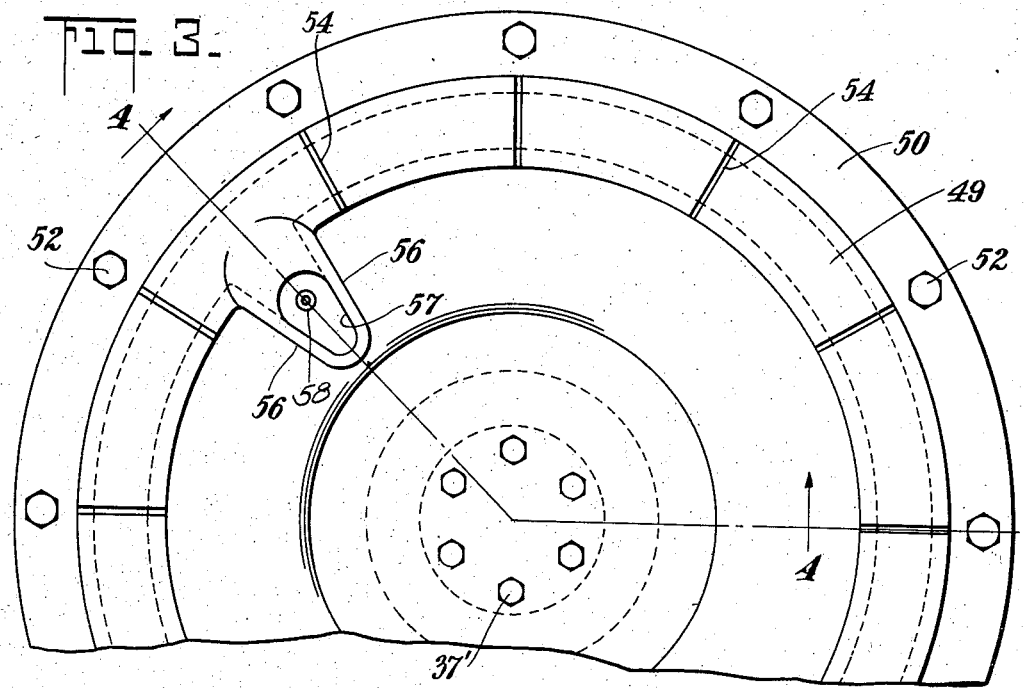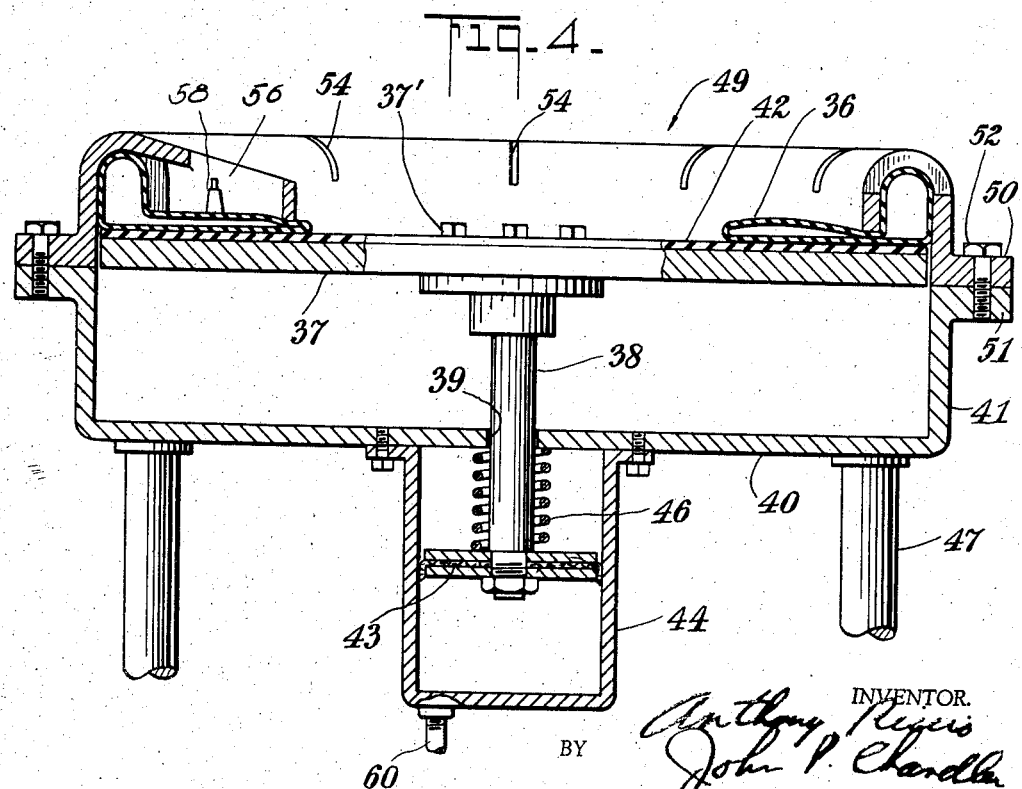

Patented Feb. 7, 1939

2,145,890

UNITED STATES PATENT OFFICE 2,145,890

APPARATUS FOR REINFORCING INNER TUBES

Anthony Riccio, Brooklyn, N. Y.

Application September 29, 1936, Serial No. 103,211

5 Claims. (Cl. 91—18)

This invention relates to improvements in means for reinforcing inner tubes for automobiles and the like, and constitutes a continuation-in-part of my co-pending application, Ser. No. 92,586, filed July 25, 1936, and entitled "Method and apparatus for reinforcing inner tubes."

In the aforesaid application I described a method and apparatus for joining an endless band of puncture proofing material to the inner surface of the portion of the tube adjacent to the tread of the tire after the tube was completed. This method consisted generally in introducing a quantity of a fluid sealing substance into the tube, then placing the tube in a rotating bowl or centrifuge, introducing a fair quantity of air into the tube then rotating same to secure a uniform distribution of the substance over the inner surface of the outer periphery of the tube. After rotating the tube for something less than a minute in order to receive an even distribution of the substance, a quantity of a suitable coagulating substance was introduced into the tube while still rotating by the use of a novel device described in said application. The outer surface of the sealing substance thus became somewhat hardened, leaving the portion of the substance adjacent to the tube in a more less fluid condition.

Thus, when a puncture occurred and the nail or other sharp instrument withdrawn from the tire, the air pressure within the tube forced the semi-fluid substance into the opening, which upon coming in contact with the air hardened and effectively sealed the tube.

In the present invention I likewise introduce a suitable quantity of a fluid sealing substance into the tube and then place the tube in a rotating bowl or centrifuge and rotate the tube and thus secure a uniform distribution of the material over the desired portion of the tube. In this instance, however, I employ a relatively heavier fluid and incorporate therein, just prior to introducing into the tube, a coagulating fluid. The sealing is thus at the point of coagulation when it is forced into the tube. By employing this heavy, highly viscous fluid it is necessary that its passage into the tube be confined to the area where it is to finally remain, to wit, around the inner surface of the outer periphery, since when material of this character once come into contact with the rubber in the tube it cannot be separated therefrom, even under considerable contrifugal force.

Accordingly, in carrying out the present invention I mount the flat, deflated tube on a base or platen and then place in engagement therewith an annular distribution ring which effectively confines the fluid substance to the greatest circumference of the tube. The tube is then placed in a centrifuge or rotating device of the type shown in my co-pending application and rotated until an even distribution over the desired area is secured.

In the drawings:

Fig. 3 is a broken top plan view of modified form of tube supporting device; and Fig. 4 is a vertical section taken on line 4—4 of Fig. 3.

The fluid sealing substance which I employ comprises a mixture of liquid latex, a filler such as wheat flour, a small quantity of glycerin and a somewhat larger quantity of pine tar. These ingredients are thoroughly mixed together and a few moments before the mass is introduced into the tube a small quantity of a fluid coagulant such as acetic acid is incorporated into the mixture. The fluid sealing substance is thus on the verge of coagulation when it is introduced into the tube and accordingly it should be moved into the tube as rapidly as possible and its location must be confined therein to the greatest circumference of the tube. As previously stated, the substance is a relatively heavy, highly viscous mass, which when it is engages the rubber will be immediately relatively permanently adhered thereto. In the finished reinforced tube, the substance is caused to form a continuous band around the inner surface of the outer periphery of the tire, which is adjacent to the tread portion of the causing. In width, this area is approximately one third of the circumference of the tube in transverse section. Accordingly it is imperative that the substance must be confined to this area.

Figure 1:
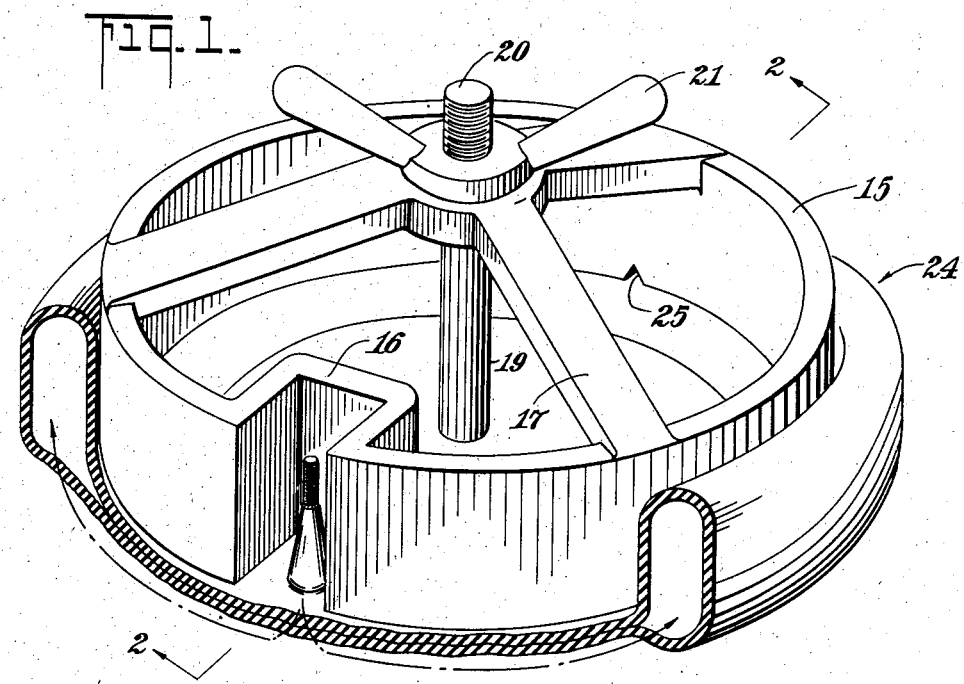
Fig. 1 is a broken perspective view of the apparatus for blocking off the passage of the sealing substance in the inner tube.
Figure 2:
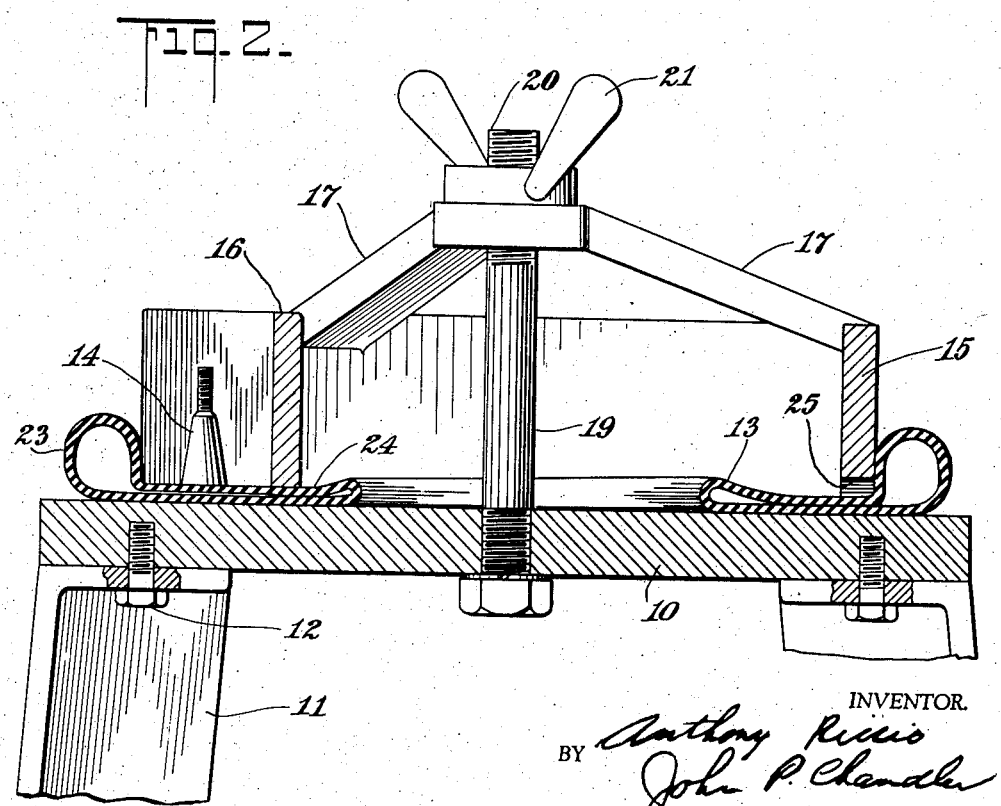
Fig. 2 is a central vertical section taken on line 2—2 of Fig 1.

In order to accomplish this the device illustrated in Figs. 1 and 2 is employed for blocking off the flow of the liquid in the tube generally and distributing it evenly around the location of its greatest circumference, said device comprising a circular platen 10 of substantial thickness, which forms a base support for the tube, the platen being supported by means of legs 11, which are secured to the platen disc by means of screws 12. A standard uninflated tube 13 is placed upon the platen or disc, the tube occupying a relatively flat portion as is well known. When in this position, the valve structure 14 maintains in an upright position, as shown in Figs. 1 and 2.

An annular band or distribution ring 15 approximately one inch in thickness is now laid upon the tube, the band having an inwardly turned substantially U-shaped portion 16 wherein the valve 14 of the tube 24 is positioned. The band 15 is further provided with a plurality of integrally formed radially disposed supports 17, which converge at the center thereof. This band is held in place and in firm engagement with the tube by means of a centrally disposed vertical bolt 19, having a threaded upper end portion 20 provided with a wing nut 21. It will be noted from an examination of Fig. 2 that a portion 23 of the tube 24, substantially circular in transverse section, projects beyond the outer periphery of the distribution band. The fluid sealing substance is introduced into the tube through the valve 14, and passes into the annular area outside the distribution band. In view of the fact that the fluid substance is a rather dense mass, it is preferable to introduce same into the tube under pressure in order that it may pass to all desired parts thereof before it coagulates.

The substance, upon entering the tube, proceeds to move therearound in both directions, wherein it meets at the opposite side. Inasmuch as there is normally a small amount of air in the uninflated tube, the ring 15 is provided with a triangular or other shaped cut-out portion or vent 25 at a point opposite the U-shaped portion 16 in order to permit the air to escape from the outer portion as the fluid sealing substance is introduced into the tube. Enough of the substance is introduced into the tube in order to completely fill the circular annular area. The distribution ring 15 is now removed from the base and the tube 24 placed in a suitable centrifuge or rotating device which is adapted to evenly distribute the material over the desired area. Although not essential, it is oftentimes desirable to introduce a quantity of air into the tube prior to the rotation thereof in order to facilitate the proper distribution of the material.

The distribution device shown in Figs. 3 and 4 is similar to that shown in Figs. 1 and 2, except that in the first embodiment the distribution ring is manually laid upon the tube, whereas in the second embodiment the distribution ring is fixed, and the platen is caused to move upwardly in engagement therewith by means of fluid pressure. In this instance, the tube 36 is supported on the circular platen 37 which in turn is mounted on a vertical shaft 38 by means of bolts 37. The shaft passes through a central aperture 39 in a supporting member 40 having a vertical flange 41. The upper surface of the platen is provided with a rubber facing upon which the tube rests. A piston 43 secured to the lower end of the shaft 38 is positioned within a cylinder 44 mounted on the lower surface of the support 40. The shaft 38 and the platen 37 are urged downwardly by means of a coil spring 46. The support 40 is mounted on a plurality of legs 47.

In this embodiment of the invention the distribution ring 49 comprises an annular member which is substantially U-shaped in transverse section and is provided with an integrally formed horizontal flange 50 extending around the outer periphery thereof, said flange being bolted as at 52 to a horizontal flange 51 formed integrally with the annular portion 41 around the support 40. The ring 49 is formed with a plurality of spaced slots 54 in order to permit the operator to observe the tube as the fluid substance flows thereinto.

The ring is further formed with a substantially oval shaped inwardly disposed housing comprising side walls 56 and having an opening 57 to provide access to the valve 58 of the tube. In this instance the tube is laid flat upon the platen when the latter is in its lowered position. Air is then introduced into the cylinder 44 through the port 60 which causes the plate to move upwardly until the tube is in firm engagement with the lower edge of the ring. The fluid substance is now introduced into the tube as aforesaid.

What I claim is:—

1. In a device of the class described, the combination of a flat member adapted to support a deflated inner tube and an annular ring adapted to engage the deflated tube when supported on the flat member and to divide the tube into a plurality of annular sections, the ring having an inwardly turned portion adapted to partially encircle the tube valve and include same in the outer section.

2. In a device of the class described, the combination of a flat member adapted to support a deflated inner tube and an annular ring adapted to engage the deflated tube when supported on the flat member and to divide the tube into a plurality of annular sections, the ring having an inwardly turned portion adapted to partially encircle the tube valve and include the same in the outer section, and means extending between the flat member and the ring for urging the latter into firm engagement with the tube.

3. In a device of the class described, the combination of a flat member for supporting a deflated inner tube and means for dividing the tube into two annular concentric sections, said means comprising an annular member having a lesser diameter than the greatest diameter of the tube and adapted to engage the tube, said annular member having an inwardly turned portion adapted to partially encircle the tube valve and include same in the section of the tube having the greater diameter.

4. In a device for introducing a punctureproofing compound into an inner tube and confining said substance to the area constituting the largest circumference of the tube, the combination of a circular base for supporting the flat, deflated tube and an annular distribution ring of lesser diameter than the outer periphery of the tube and adapted to engage the tube and divide same into a plurality of concentric annular sections, said ring having a substantially U shaped inwardly turned portion adapted to partially encircle the valve section and to include same in the larger annular section.

5. In a device of the class described, the combination of a circular platen adapted to support a deflated inner tube, an annular member of lesser diameter than that of the tube mounted above said platen, and means for raising the platen into engagement with the annular member to divide the tube into a plurality of annular concentric portions.

ANTHONY RICCIO.